(12) United States Patent
Caron

(10) Patent No.: US 11,441,284 B2
(45) Date of Patent: Sep. 13, 2022

(54) MULTIFUNCTIONAL PILE

(71) Applicant: Christelle Caron, Gagny (FR)

(72) Inventor: Christelle Caron, Gagny (FR)

( * ) Notice: Subject to any disclaimer, the term of this patent is extended or adjusted under 35 U.S.C. 154(b) by 0 days.

(21) Appl. No.: 16/863,974

(22) Filed: Apr. 30, 2020

(65) Prior Publication Data

US 2020/0362528 A1 Nov. 19, 2020

(51) Int. Cl.
*E02D 5/80* (2006.01)
*E02D 7/04* (2006.01)

(52) U.S. Cl.
CPC ........ *E02D 5/80* (2013.01); *E02D 7/04* (2013.01)

(58) Field of Classification Search
CPC ............ E04H 12/2269; E04H 12/2215; E04H 12/2253; E02D 27/42; E02D 5/80; E02D 7/04

See application file for complete search history.

(56) References Cited

U.S. PATENT DOCUMENTS

| | | | |
|---|---|---|---|
| 3,417,525 A | 12/1968 | Dashio | |
| 4,037,373 A * | 7/1977 | Echtler | E02D 5/80 |
| | | | 52/127.5 |
| 4,649,678 A * | 3/1987 | Lamson | E01F 15/0469 |
| | | | 248/530 |
| 4,801,128 A * | 1/1989 | Taylor | E02D 5/80 |
| | | | 175/19 |
| 6,234,444 B1 * | 5/2001 | Haddad | A01G 9/122 |
| | | | 248/156 |
| 7,735,166 B1 | 6/2010 | Weeks | |
| 9,468,275 B2 * | 10/2016 | Silberman | E04H 12/2215 |
| 2008/0236059 A1 | 10/2008 | Mershon | |
| 2010/0319272 A1 | 12/2010 | Kellner | |
| 2016/0024739 A1 * | 1/2016 | Kelleher | E02D 7/30 |
| | | | 405/232 |

FOREIGN PATENT DOCUMENTS

| | | | |
|---|---|---|---|
| CN | 202796991 | * | 3/2013 |
| DE | 4230776 | | 3/1994 |
| JP | 2004108780 | * | 8/2004 |

OTHER PUBLICATIONS

International Search Report dated Jan. 21, 2020.

* cited by examiner

*Primary Examiner* — Carib A Oquendo
(74) *Attorney, Agent, or Firm* — Ipsilon USA, LLP

(57) ABSTRACT

A pile (1) intended to be driven into the ground to serve to support an object, the pile (1) having a conical shape terminating in a point (5). The pile (1) has at least two lugs (4) each having a slope (12) intended to favour driving of the pile (1) into the ground and an abutment (9) intended to prevent the withdrawal of the pile (1) in a direction that is opposite to that of the driving in, and in that it has an orifice (18) intended to receive an end-piece adapted to support an object.

16 Claims, 8 Drawing Sheets

MULTIFUNCTIONAL PILE

This application claims the benefit of priority from French Patent Application No. 19 04621, filed on May 2, 2019, the entirety of which is incorporated by reference.

FIELD OF THE INVENTION

The present invention concerns a multifunctional pile.

This type of pile is designed to be buried in the ground in order to serve to support various objects intended to emerge from said ground and adapted to fulfil various functions.

DESCRIPTION OF RELATED ART

Patent Application FR2711926 describes a synthetic grass implant intended to be fixed in the ground by means of a pile. That implant comprises the synthetic grass and the pile, said pile being threaded so that it can be driven into the ground manually by imparting to it a rotary and pushing movement. Once the implant is correctly positioned, the pile is buried in the ground without emerging therefrom, only the strands of synthetic grass projecting from the ground. Now, a pile of this kind has the two-fold disadvantage of being dimensioned only to fulfil only one function, namely supporting synthetic grass, and of featuring a lack of symmetry because of the presence of its screwthread, necessitating laborious manipulations when driving it into the ground and not necessarily guaranteeing a vertical orientation of said pile in the ground.

OBJECTS AND SUMMARY

A pile according to the invention has structural features enabling it to be driven into the ground easily and reproducibly whilst being adapted to support a multiplicity of objects having varied functions.

The subject matter of the invention is a pile intended to be driven into the ground to serve to support an object, said pile having a conical shape terminating in a point.

According to the invention, the pile comprises at least two lugs each having a slope intended to favour the driving of the pile into the ground and an abutment intended to prevent the withdrawal of the pile in a direction that is opposite to that of said driving in, said pile including an orifice intended to receive an end-piece adapted to support an object. The lugs therefore have a dual function: that of facilitating the driving of the pile into the ground and that of fixing the position of the pile in said ground and preventing easy withdrawal of the latter from said ground. A pile according to the invention also has a universal character because the end-piece may be any shape to fulfil a particular function, the only constraint being that this end-piece must have a part adapted to cooperate with the orifice of the pile in order to be fastened thereto. An end-piece of this kind may for example serve to fix a sprinkler pipe, a lamp or flag, the applications being very numerous and varied. The end-piece may be attached to the pile by any means, such as for example screwing or clipping. The pile is advantageously intended to be driven into the ground in a substantially vertical direction. The pile is preferably intended to remain under the surface of the ground. The pile is preferably made of plastic material. It is assumed that the pile has an axis of revolution that coincides with a longitudinal and central axis of said pile. The lugs and the pile are advantageously made from the same material and form a one-piece common part, manufactured in one and the same operation. For a pile according to the invention, driving into the ground is effected by simple, preferably vertical, sliding, without necessarily having recourse to rotating the pile about its axis of revolution.

According to one possible feature of the invention, each is delimited by three triangular faces of which a first surface extends in a plane that is perpendicular to a longitudinal and central axis of the pile and that constitutes the abutment and second and third surfaces of which arise on the pile and are joined at the level of a crest line the slope of which is greater than that of said pile. In other words, each of the lugs is profiled so as to favour the driving of the pile into the ground through the existence of the second and third surfaces and so as to prevent easy withdrawal of said pile thanks to the presence of the first surface.

According to one possible feature of the invention, the pile has three rows of lugs each comprising at least two lugs, each of said rows being disposed around the longitudinal and central axis of the pile. In this way, the lugs are distributed equitably and homogeneously along the pile and enable driving of said pile into the ground to be favoured.

According to one possible feature of the invention, the pile has a first end terminating in a point and a second end that is opposite said first end and terminates in a rear wall, the orifice being situated at the centre of that rear wall. In this way, assuming that the pile would be driven into the ground along a vertical axis, the end-piece would be found above said pile and would be easily accessible by a person standing on the ground.

According to one possible feature of the invention, the orifice is threaded and is extended toward the interior of the pile by an internal cavity. In this way, for this configuration, it is necessary for the end-piece to have a threaded section by means of which it will be screwed into the orifice of the pile. The threaded orifice constitutes an entry for the cavity. The cavity preferably extends over at least half the total length of the pile. This cavity participates in reducing the weight of the pile and enables the possible accommodation of an object of small size.

According to one possible feature of the invention, the internal cavity encloses an element adapted to locate the position of the pile in the ground by means of a device for detecting said element. Indeed, once the pile has been driven into the ground to fulfil a particular function, it is possible to lose all trace of it because it does not emerge from the ground. The insertion in the pile of an element that can be located in a plane or be the subject of a particular kind of detection will make it possible to locate rapidly the pile that has been driven into the ground.

According to one possible feature of the invention, the element is to be chosen from an electronic component and a metal component. The electronic component is intended to enable geolocation of the pile in a plane and the metal component is going to be detectable by means of a usual metal detector device.

According to one possible feature of the invention, the rear wall is domed to make it possible to facilitate placing the end-piece in the orifice or withdrawing it therefrom.

According to one possible feature of the invention, the rear face features an annual groove. This annular groove is intended to receive a cylindrical end of a tool in such a manner as to be able to drive the pile into the ground in a sure and robust manner, with no possibility of seeing said tool slip on the pile.

Another subject matter of the invention is an assembly including a pile according to the invention.

According to the invention, the assembly includes an end-piece fixed in the orifice of said pile and adapted to fulfil a function of supporting a specific object.

Another subject matter of the invention is a tool suitable for driving a pile according to the invention into the ground.

According to the invention, the tool has a cylindrical end the diameter of which corresponds to the diameter of the annular groove of the pile and a widened flange set back from said cylindrical end. The distance separating the flange and the cylindrical end will define the depth to which the pile is driven into the ground. Indeed, the tool will come to be placed on top of the pile so that its cylindrical end is inserted in the annular groove of the rear wall of the pile. Downward pressure exerted on the tool will then lead to the pile being driven into the ground until the enlarged flange of the tool comes to abut against the ground.

Another subject matter of the invention is a method of driving into the ground a pile according to the invention by means of a tool according to the invention.

According to the invention, the method comprises the following steps:
 a step of inserting the cylindrical end of the tool in the annular groove on the rear face of the pile,
 a step of pushing the tool downward leading to vertical driving of the pile into the ground facilitated by the presence of the lugs,
 a step of stopping pushing when the flange abuts against the ground,
 a step of withdrawing the tool.

Another subject matter of the invention is a kit comprising at least one pile according to the invention, a tool according to the invention and at least one end-piece adapted to be fixed in the orifice of said at least one pile and intended to fulfil a specific function. A kit of this kind enables a user to be supplied with all the elements enabling them to proceed to drive at least one pile into the ground provided with an end-piece appropriate to their requirements.

Another subject matter of the invention is use of at least one pile according to the invention in an activity to be chosen among implanting stakes in the ground in order to delimit a pen for animals, implanting a flag, placing an RF transmitter stake for marking out the ground, placing a lamp, placing a stake for erecting a games net, placing a sprinkler stake, fixing a sprinkler pipe, fixing a garden shelter or an awning, fixing a sunshade, marking out a sports field, marking out an aerodrome, hitching up an animal, using a game of rackets based on a ball fixed to a bungee, using synthetic fibres to mark out the ground, and marking hiking paths. These are nonlimiting illustrative examples of applications in which the use of piles according to the invention is particularly suitable.

A pile according to the invention has the advantage of a universal character because it is able to receive a plurality of different end-pieces adapted to assure different functions. In this way, the pile is able to support or to attach any type of object linked to the specific end-piece that is mounted in the pile. Also, it has the advantage of being configured to be easily driven into the ground thanks to the presence of profiled lugs facilitating driving in and preventing easy withdrawal of said pile. It also has the advantage of remaining buried in the ground, without modifying the surface of the ground and without constituting an obstacle liable to injure or to unbalance a person. Finally it has the advantage that it can be located easily thanks to the presence of a cavity in which may be placed an element easy to detect by means of the usual detection devices.

BRIEF DESCRIPTION OF THE DRAWINGS

There is given hereinafter a detailed description of a preferred embodiment of a pile, a tool and a driving in method according to the invention, given with reference to the following figures.

DETAILED DESCRIPTION

Figure 1:
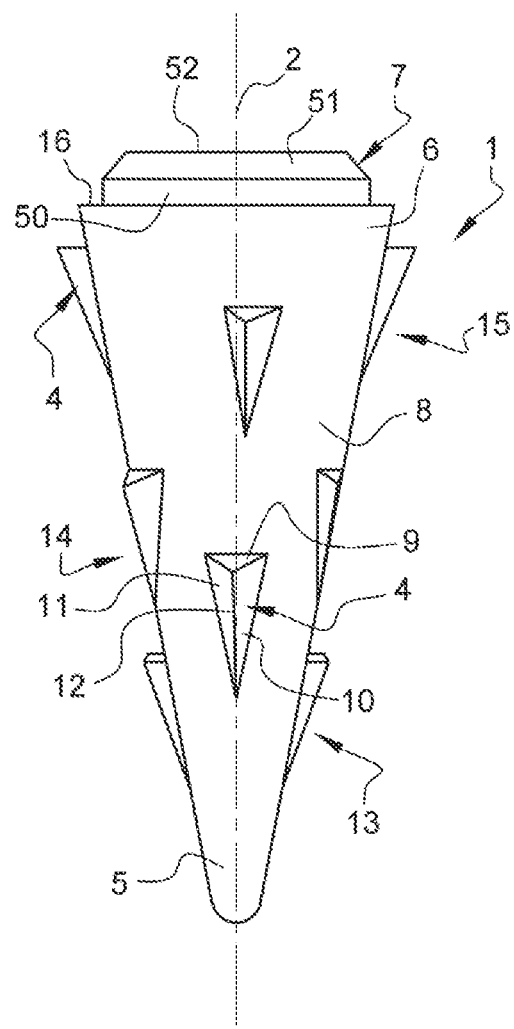
FIG. 1 is a side view of a pile according to the invention.
Figure 2:
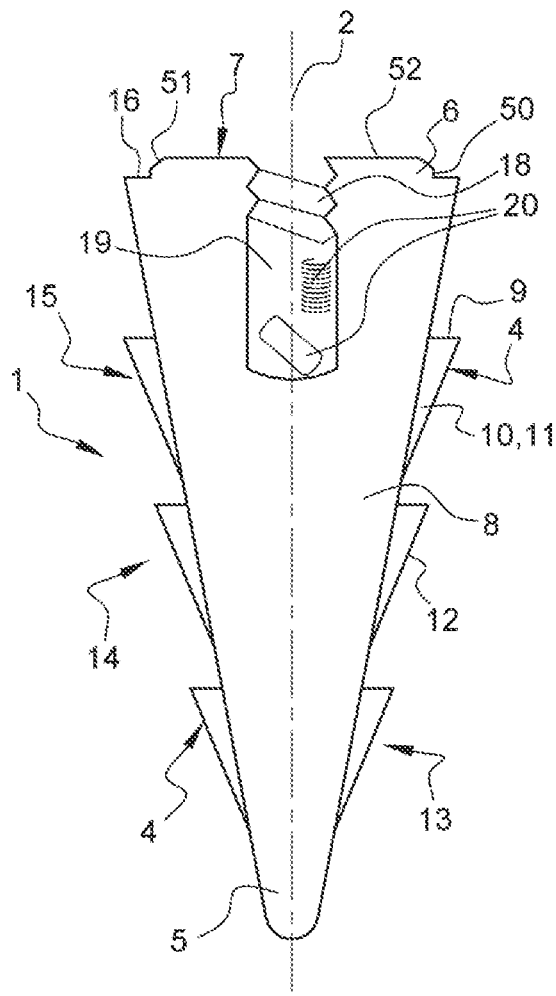
FIG. 2 is a view of the pile from FIG. 1 in longitudinal axial section.

Referring to FIGS. 1 and 2, a pile 1 according to the invention is an elongate object having a conical shape, said object having an axis 2 of revolution that coincides with a longitudinal and central axis of said pile 1. The pile 1 therefore has two ends 5, 6 along a longitudinal axis 2 of said pile 1, a first end 5 that is pointed and a second end 6 that terminates at a rear wall 7 inscribed in a plane that is perpendicular to said longitudinal axis 2. The cross section of the pile 1 is at a maximum at the second end 6 and at a minimum at the tip. The pointed first end 5 does not terminate in a sharp point, but in a slightly rounded point with no risk of injuring a user when manipulating said pile 1.

Figure 7A:
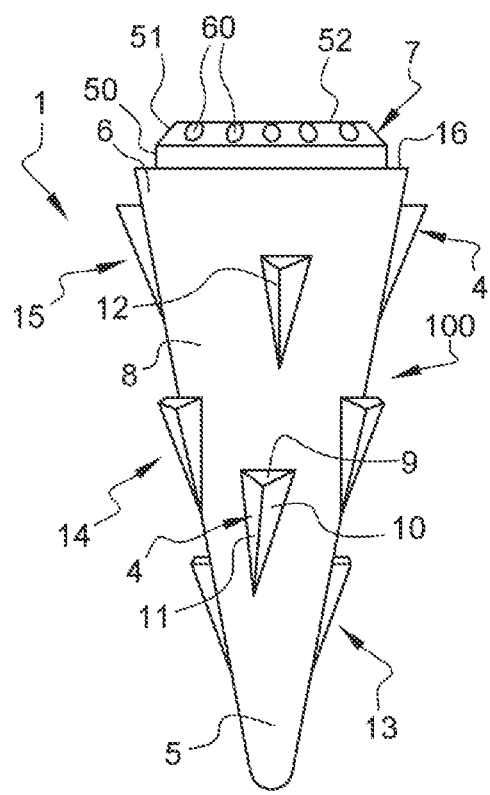
FIG. 7A is a side view of a particular embodiment of a pile according to the invention.

Referring to FIGS. 1, 2 and 7A the exterior surface 8 of the pile 1 features a plurality of identical lugs 4 each delimited by three triangular surfaces 9, 10, 11, of which:
 A first surface 9 arises on the exterior surface 8 of the pile 1 and extends in a plane that is perpendicular to the longitudinal axis 2 of the pile 1, and
 A second surface 10 and a third surface 11 arise on the exterior surface 8 of the pile 1 and on two sides of the first surface 9, and joining at the level of a crest line 12 the slope of which relative to a longitudinal axis 2 of said pile 1 is greater than that of said pile 1. In accordance with a preferred embodiment of a pile 1 according to the invention, said pile 1 includes three rows 13, 14, 15 of lugs 4 each disposed around the axis 2 of revolution of the pile 1. Of these three rows, a first row 13 is disposed on the side of the pointed first end 5 and comprises two lugs 4, a third row 15 is disposed on the side of the widened second end 6 and comprises six lugs 4, and an intermediate second row 14 situated between the first row 13 and the third row 15 comprises four lugs 4. All the lugs 4 are oriented in the same manner on the pile 1, so that the triangular first surface 9 is situated on the side of the enlarged second end 6 and so that the triangular second and third surfaces 10, 11 extend behind said first surface 9 toward the pointed first end 5 of the pile 1.

Referring to FIGS. 1 and 7A, the rear wall 7 includes a plane peripheral track 16 inscribed in a plane that is perpendicular to a longitudinal axis 2 of the pile 1 and a central protrusion arising at the level of said track 16 and extending toward the exterior of the pile 1 so as to increase the total length of said pile 1. The central protrusion includes a cylindrical part 50 arising on the peripheral track 16 the diameter of which is less than the outside diameter of said track 16, said cylindrical part 50 being extended by a frustoconical part 51 terminating in a plane face 52. The peripheral track 16 that is in part delimited by the central part 17 defines an annular groove.

Figure 7B:
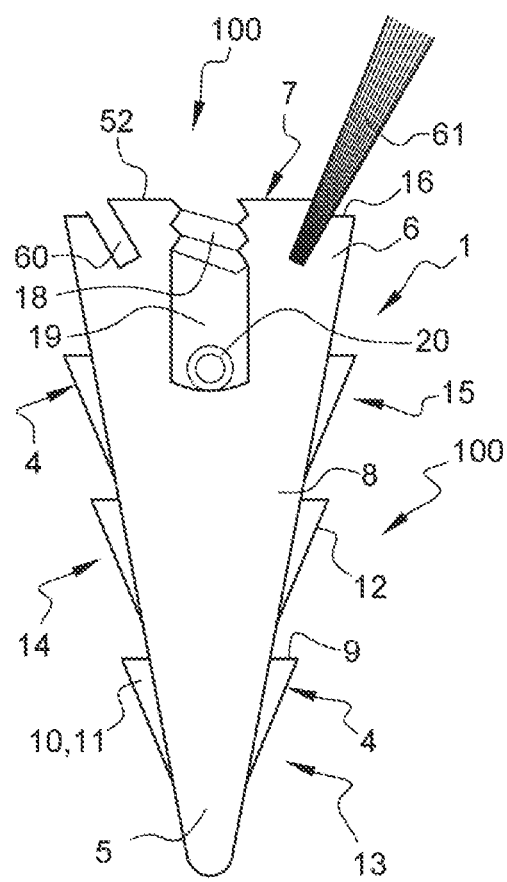
FIG. 7B is a view in longitudinal axial section of the particular embodiment from FIG. 7A.

Referring to FIGS. 2 and 7B, a threaded orifice 18 is produced in the central protrusion of the rear wall 7, said orifice 18 being cylindrical and having an axis of revolution that coincides with the axis 2 of revolution of the pile 1. That orifice 18 arises on the plane face 52 of the central protrusion and progresses toward the interior of said central protrusion. An internal cavity 19 extends the threaded orifice 18 toward the interior of the pile 1. This internal cavity 19 preferably has a cylindrical shape and an axis or revolution that is aligned with the axis 2 of revolution of the threaded hole 18. The diameter of the cavity 19 is substantially equal to that of the threaded hole 18 and its length is advantageously greater than half the total length of the pile 1. This cavity 19 participates in reducing the weight of the pile 1 and also makes it possible to accommodate an element 20 adapted to enable location of said pile 1 by means of a known detector device. This element 20 may for example be an electronic component that will enable geolocation of the pile 1 on a map, an electronic component that will transmit information, or a metal component that could be detected by means of the usual metal detector devices.

Referring to FIGS. 3A, 3B, 4A, 4B, 5A, 5B, 6A and 6B an end-piece 21, 22, 23, 55 comes to be screwed into the threaded orifice 18 of the pile 1 in order to enable the pile 1 to support any object. The only common point that all these end-pieces 21, 22, 23, 55 must have is to be provided with a threaded section 24 adapted to come to be screwed into the threaded orifice 18 of the pile 1. The rest of the end-piece 21, 22, 23, 55 is configured as a function of the use that it is required to make of said end-piece 21, 22, 23, 55.

Figure 8:
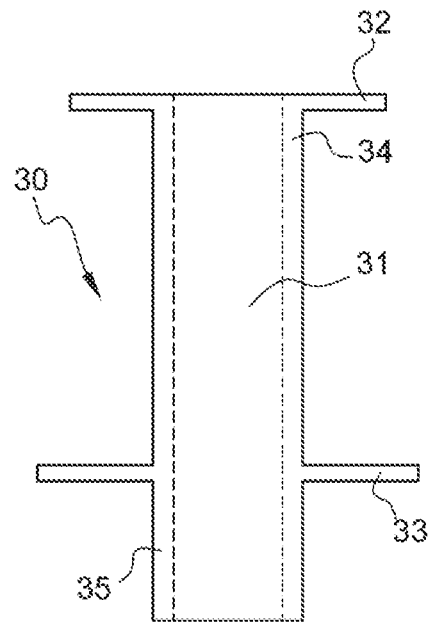
FIG. 8 is a diagrammatic side view of a tool used to drive a pile according to the invention into the ground.

Referring to FIG. 8, a tool 30 that is perfectly adapted to placing a pile 1 according to the invention in the ground comprises a hollow cylindrical body 31 and two plane flanges 32, 33 placed around said body 31. These two flanges 32, 33 are parallel and each extends in a plane that is perpendicular to the axis of revolution of the cylindrical body 31. Thus a first flange 32 is placed at a first end 34 of the cylindrical body 31 along an axis of revolution of said body 31 and will serve as a holding member for manipulating the tool 30. A second flange 33 is set back from a second end 35 of the cylindrical body 31, again along an axis of revolution of said body 32.

A method of driving into the ground a pile 1 according to the invention by means of a driving tool 30 according to the invention comprises the following steps:

a step of inserting the second end 35 of the tool 30 in the annular groove formed by the peripheral track 16 of the rear wall 7 of the pile 1, a step of positioning the assembly consisting of the tool 30 and the pile 1 along a vertical axis, said tool 30 being placed on said pile 1, a step of pushing the tool 30 downward leading to driving the pile 1 vertically into the ground, facilitated by the presence by the lugs 4 the crest line 12 of which has a slope that is greater than that of the pile 1. Driving in is achieved by means of simple vertical sliding of the pile 1 in the ground, not necessitating rotation of said pile 1 like for screwing it into the ground. This step may be carried out by light tapping with a mallet, tapping on the tool 30 several times.

A step of stopping pushing when the second flange 33 of the tool 30 comes into contact with the ground. The distance separating the second flange 33 and the second end 35 of the tool 30 will therefore define depth at which the pile 1 will be positioned in the ground relative to the surface of said ground.

A step of withdrawing the tool 30 without modifying the position of the pile 1 in the ground. Once placed in its final position, the pile 1 is found to be driven into the ground and aligned with a vertical axis, its pointed end 5 being placed under its widened end 6. It is to be noted that withdrawing the pile 1 from the ground is rendered difficult by the presence of the first surface 9 of each lug 4 fulfilling the role of a non-return abutment.

A step of screwing the required end-piece 21, 22, 23, 55 into the threaded orifice 18 of the pile 1. This step may be effected for the end-piece 21, 22, 23, 55 either at the very beginning of the process and in this case the pile 1 is driven into the ground provided with its end-piece 21, 22, 23, 55 or at the end of said process in which case said end-piece 21, 22, 23 is screwed into the pile 1 once the latter has been driven into the ground.

Figure 3A:
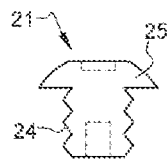
FIG. 3A is a side view of a first embodiment of an end-piece adapted to be mounted in a pile according to the invention.
Figure 3B:
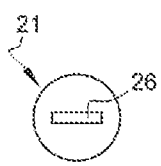
FIG. 3B is a view from above of the first embodiment from FIG. 1A.

Referring to FIGS. 3A and 3B, a first type of end-piece 21 comprises a threaded section 24 extended by a thin widened head 25 formed with a slot 26. An end-piece 21 of this kind will serve as a plug blocking the internal cavity 19 and could be screwed into or unscrewed from the orifice 18 using a screwdriver type tool the end of which will be inserted in the slot 26.

Figure 4A:
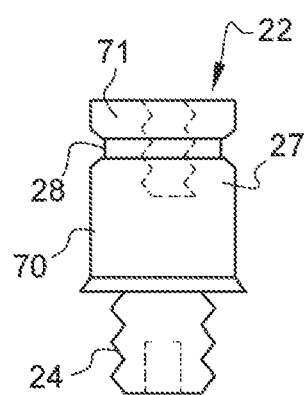
FIG. 4A is a side view of a second embodiment of an end-piece adapted to be mounted in a pile according to the invention.
Figure 4B:
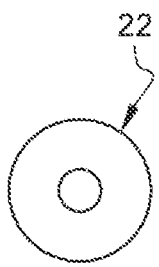
FIG. 4B is a view from above of the second embodiment from FIG. 4A.

Referring to FIGS. 4A and 4B, a second type of end-piece 22 comprises a threaded section 24 extended by a hollow cylinder 27 the axis of revolution of which coincides with that of the threaded section 24. This hollow cylinder 27 features a strangulation zone 28 similar to a gutter and enabling separation of a main first cylindrical part 70 and a secondary second cylindrical part 71, said two parts 70, 71 having a substantially constant diameter.

Figure 5A:
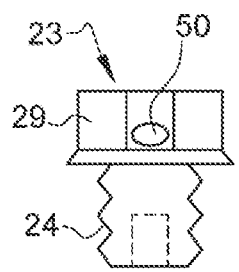
FIG. 5A is a side view of a third embodiment of an end-piece adapted to be mounted in a pile according to the invention.
Figure 5B:
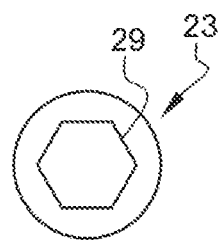
FIG. 5B is a view from above of the third embodiment from FIG. 5A.

Referring to FIGS. 5A and 5B, a third type of end-piece 23 comprises a threaded section 24 extended by a hexagonal head 29 having a channel 50 through it connecting two parallel faces of said hexagonal head 29.

Figure 6A:
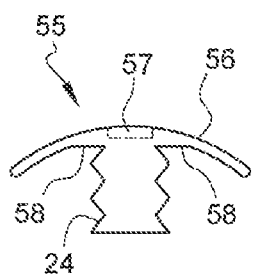
FIG. 6A is a side view of a fourth embodiment of an end-piece adapted to be mounted in a pile according to the invention.
Figure 6B:
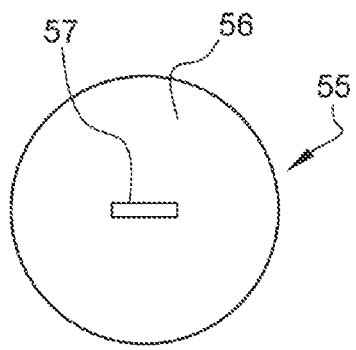
FIG. 6B is a view from above of the fourth embodiment from FIG. 6A.

Referring to FIGS. 6A and 6B, a fourth type of end-piece 55 comprises a threaded section 24 extended by a widened disc 56 that is slightly domed and formed with a slot 57. The disc 56 is formed with a plane lower wall 58 intended to come into contact with the plane wall 52 of the central protrusion of the rear wall 7 of the pile 1, said lower wall 58 being extended by a domed peripheral annular wall. Once this end-piece 55 has been screwed into the pile 1, the peripheral annular wall of said end-piece 55 projects radially from the rear wall 7 of said pile 1.

There follows a non-exhaustive list of a few applications of a pile 1 according to the invention:

A—Use of the Basic Pile 1:

For pens, for example: because of excessive flexibility shepherds have enormous difficulty in setting out temporary electrical pen stakes (protecting lambs from attacks by wolves, bears, etc.) in surfaces that often very hard. This would no longer be a problem thanks to the piles 1 according to the invention that they would be able to set out easily anywhere according to their requirements. They will place inside the cavity 19 of the pile 1 a detection element 20 and insert therein their pen stake. At the end of the season, they will remove only the stake placed inside the orifice 18 and will screw in the first type of end-piece 21 or the hexagonal third type of end-piece 23 with a multifunction hole 50 that will seal the pile 1. The following year, they will only have to identify the position of the piles 1 using a detection device and replace their stakes at exactly the same location.

Placing a stake carrying a flag as used in the USA to mark out various buried pipes. It will be easy for mowing to remove the stake and then to replace it as exactly the same location after mowing in the pile that remained in place.

Placing a solar-powered RF (Radio Frequency) transmitter stake for positioning by triangulation in the orifice 18 of the pile 1. It will therefore be possible to mark out invisibly a non-enclosed space or garden and to prevent the escape of an animal wearing a receiver collar to prevent running off and delimiting its authorized zone. This triangulation system can also be used in other fields.

Placing a solar lamp in the orifice 18 of the pile 1 enabling stand-alone lighting of a garden, luminous signalling of an aerodrome, etc. It will be easy to remove the lamps or the luminous signals before mowing the grass or maintaining a space and to return them into place easily at the same location after the work has been done.

Placing a stake in the orifice 18 of the pile 1 in order to enable fixing thereto of a net for games such as badminton for example. After the game, it is very easy to remove the equipment without leaving obstacles on the ground, but retaining the possibility of reinstalling this device very rapidly because the buried piles 1 will remain in place in the ground.

Placing sprinkler stakes (for gardens or pots) directly in the orifice 18 of the piles 1, thereby enabling them to be removed easily before mowing or maintaining a green space and returning them perfectly into place after mowing.

B—Use of the Pile with the Fourth Type of End-Piece 55

The essential vocation of an end-piece 55 of this kind is to appear on the surface of the ground as a visual indicator.

This fourth type of end-piece 55 may be of different colours enabling visible marking out but without being an obstacle on grassed or stabilized land.

This end-piece 55 may be installed on grassed or stabilized parking lots to delimit the parking places.

This end-piece 55 may be installed on baseball or other fields with inscriptions on top to mark out playing distances.

This end-piece 55 makes it possible to indicate the presence of buried pipes or other objects buried in the ground with the necessary details written thereon.

C—Use of the Pile 1 with the Hexagonal Third Type of End-Piece 23 with the Multifunction Hole 50:

This end-piece 23 enables hermetic sealing of the orifice 18 of the pile 1.

It may be installed at the foot of trees/plants or in pots with inside the orifice 18 the name, the description and/or the care instructions for the specimen.

This end-piece 23 enables sprinkling pipes to be fixed to the ground thanks to a clamping collar placed in the multifunctional hole 50.

This end-piece 23 enables awnings or garden shelters to be fixed to the ground thanks to the passage of a loop (rope) in the multifunction hole 50. It will suffice to place the piles 1 at the various required locations (the tent pegs usually employed pull out very easily and are sometimes very difficult to install depending on the hardness of the ground, and concrete plates are not aesthetically pleasing and form a hazardous obstacle). This system may also secure open sunshades and prevent them flying away.

This system is not an obstacle to mowing.

D—Use of the Pile 1 with the High Second Type of End-Piece 22 with a Multi-Support Gutter 28:

This end-piece 22 equipped at the level of the gutter 28 with a rotary ring enables a dog or a cat to be attached to this pile by means of a chain. Easy to install but also easy to remove, leaving no obstacle on the ground.

This end-piece 22 enables installation of different games that would be interchangeable such as for example Jokari®. Once the game has ended, the pile 1 remains in place and its simply suffices to remove the elastic. It is possible to install another game therein instead.

This end-piece may be equipped at its centre with long fibres enabling temporary marking out, for example in snow (as at Olympic games) or other terrain. Indeed, the orifice inside this end-piece 22 enables long fibres to be implanted or glued.

This orifice is advantageously threaded and is identical to the orifice 18 of the pile 1, 100. In this way, this end-piece 22 once screwed onto the pile 1, 100 enables upward offsetting of the threaded orifice 18 of the pile 1, 100 if the latter were buried in the ground and were to become difficult to access.

It is also possible to place in the orifice of the end-piece 22 a paper message or an electronic component adapted to transmit information and to seal it hermetically with the first type of end-piece 21, similar to a stopper. This can enable easier access to the message (in flower pots, etc.) or improve reception in the case of using an electronic component.

Referring to FIGS. 6A and 6B, a pile 100 according to the invention may also be used without necessarily fitting an end-piece 21, 22, 23. Indeed, in the present example, the domed central part 17 of the rear face 7 of the pile 100 is pierced by a number of holes 60 equitably distributed a circle placed around the threaded orifice 18. The number of holes 60 advantageously varies between 6 and 12.

Referring to FIG. 6B, a tuft 61 of synthetic fibres is inserted in each hole 60 in the rear face 7 of the pile 100 and is fixed, for example glued, to the latter. When the pile 100 is driven into the ground in its final position, that is to say in a vertical position in which the widened end 6 is placed above the pointed end 5 but below ground level, all the tufts 61 will emerge upward from said ground. For this configuration, an end-piece 21, 22, 23 may block the threaded orifice 18.

This pile 100 carrying fibres enables easy and rapid marking out because the synthetic tufts 61 will render the pile 100 visible on soil or grassy ground without representing an obstacle either to persons or to mowing.

This pile 100 carrying fibres enables rapid marking out without repeating the measurements of a sports pitch to facilitate marking out thereof, that sports pitch being for example a football, rugby, baseball, etc. pitch.

The fibre on this pile 100 may be of several colours which enables colour-coded marking out as required.

This coloured pile 100 may be used for orienteering.

This fibre-carrying pile 100 may also be two-coloured, enabling its use for marking out hiking paths (instead of markings painted on trees). It could likewise be equipped with a microchip connected to an application enabling information to be obtained on the site in which one is located.

All the examples of use of a pile 1, 100 according to the invention mentioned in the present description are mentioned by way of purely nonlimiting illustration.

Apart from its ease of manipulation, in particular for driving it into the ground thanks to the presence of profiled lugs 4, a pile 1 according to the invention has a universal character primarily because of the presence of the threaded orifice 18 which may either serve directly as a receptacle for any object or receive an end-piece 21, 22, 23, 55 specifically designed for a particular function. The pile 1 constitutes a common and constant part of the invention adapted to receive a multiplicity of end-pieces 21, 22, 23, 55 each designed to fulfil a particular function.

The invention claimed is:

1. A pile configured to be driven into the ground to serve to support an object, said pile being made of plastic material having a conical shape terminating in a point, said pile comprising:
    at least two lugs, located on an outside surface of said pile, said outside surface of said pile being entirely conical, each of said at least two lugs having a slope intended to favour driving of the pile into the ground and an abutment intended to prevent the withdrawal of the pile in a direction that is opposite to that of said driving in,
    said pile has an orifice to receive an end-piece adapted to support an object, and has a first end terminating in a point, and a second end that is opposite to said first end and terminating in a rear wall, and in that the orifice being situated at the center of that rear wall,
    wherein the orifice is threaded and is extended toward the interior of the pile by an internal cavity, and
    wherein the internal cavity encloses an element adapted to locate the position of the pile in the ground by means of a device for detecting said element, said element being an electronic component that is adapted to transmit information that enables geolocation of the pile on a map.

2. The pile according to claim 1, wherein each lug is delimited by three triangular faces of which one face extends in a plane that is perpendicular to a longitudinal and central axis of the pile and that constitutes the abutment and second and third surfaces of which arise on the pile and are joined at a level of a crust line a slope of which is greater than that of said pile.

3. The pile according to claim 1, wherein the pile has three rows of lugs each comprising at least two lugs, and in that each of said rows is disposed around the longitudinal and central axis of the pile.

4. The pile according to claim 1, wherein the rear face features an annular groove.

5. A tool adapted to drive a pile according to claim 4 into the ground, wherein said tool has a cylindrical end, a diameter of which corresponds to the diameter of the annular groove of the pile, and in that said tool includes a widened flange set back from said cylindrical end.

6. The pile according to claim 1, wherein the slope of said lugs, relative to a longitudinal axis of said pile, is greater than that of said pile.

7. The pile according to claim 1, wherein the internal cavity extends the threaded orifice 18 toward the interior of the pile.

8. The pile according to claim 7, wherein the internal cavity has a cylindrical shape and an axis or revolution that is aligned with an axis of revolution of the threaded hole.

9. The pile according to claim 1, wherein a diameter of the cavity is substantially equal to that of the threaded hole and its length is greater than half a total length of the pile.

10. The pile according to claim 1, wherein said electronic component is a radio transmitter.

11. The pile according to claim 10, wherein said radio transmitter is a solar powered radio transmitted.

12. The pile according to claim 10 wherein said radio transmitter is configured for triangulation geolocation.

13. An assembly comprising:
    a pile according to claim 1, wherein the assembly includes an end-piece fixed in the orifice of said pile and adapted to fulfil a function of supporting a specific object.

14. A method of driving said pile into the ground by a tool according to claim 5 wherein said method includes the following steps:
    a step of inserting the cylindrical end of the tool in the annular groove on the rear face of the pile,
    a step of pushing the tool downward leading to vertical driving of the pile into the ground facilitated by the presence of the lugs,
    a step of stopping pushing when the flange abuts against the ground,
    a step of removing the tool.

15. A kit comprising said pile and a tool according to claim 5, said kit having at least one end-piece adapted to be fixed in the orifice of said at least one pile and intended to fulfil a specific function.

16. A method comprising:
    any one of implanting stakes in the ground in order to delimit a pen for animals, implanting a flag, placing a RF (radio frequency) transmitter stake for marking out the ground, placing a lamp, placing a stake for erecting a games net, placing a sprinkler stake, fixing a sprinkler pipe, fixing a garden shelter or an awning, fixing a sunshade, marking out a sports field, marking out an aerodrome, attaching an animal, using a set of rackets based on a ball fixed to an elastic string, using synthetic fibres to mark out a terrain, and marking hiking paths, wherein said method includes a pile according to claim 1.

* * * * *